US012724467B2

(12) United States Patent
Chen

(10) Patent No.: US 12,724,467 B2
(45) Date of Patent: Sep. 1, 2026

(54) ELECTRONIC DEVICE AND INTEGRATED CAMERA THEREOF

(71) Applicant: AZUREWAVE TECHNOLOGIES, INC., New Taipei City (TW)

(72) Inventor: Ju-Hung Chen, New Taipei City (TW)

(73) Assignee: AZUREWAVE TECHNOLOGIES, INC., New Taipei City (TW)

( * ) Notice: Subject to any disclaimer, the term of this patent is extended or adjusted under 35 U.S.C. 154(b) by 0 days.

(21) Appl. No.: 19/196,891

(22) Filed: May 2, 2025

(65) Prior Publication Data

US 2026/0186540 A1 Jul. 2, 2026

(30) Foreign Application Priority Data

Jan. 2, 2025 (TW) ................................ 114100010

(51) Int. Cl.

| | |
|---|---|
| ***G09G 5/00*** | (2006.01) |
| ***G06F 1/16*** | (2006.01) |
| ***G06F 1/18*** | (2006.01) |

(52) U.S. Cl.

CPC .......... *G06F 1/1686* (2013.01); *G06F 1/1605* (2013.01); *G06F 1/1698* (2013.01); *G06F 1/182* (2013.01); *G06F 1/189* (2013.01)

(58) Field of Classification Search

CPC ..... G06F 1/1686; G06F 1/1605; G06F 1/1698

USPC .......................................................... 345/156

See application file for complete search history.

(56) References Cited

U.S. PATENT DOCUMENTS

| | | | |
|---|---|---|---|
| 2017/0222299 A1 | 8/2017 | Chiu et al. | |
| 2017/0309990 A1 | 10/2017 | Shih et al. | |
| 2022/0006176 A1* | 1/2022 | Froese | H01Q 1/12 |
| 2022/0115771 A1* | 4/2022 | Kang | H01Q 1/243 |
| 2023/0344140 A1* | 10/2023 | Kwon | H01Q 17/007 |

FOREIGN PATENT DOCUMENTS

| | | |
|---|---|---|
| JP | 2021122150 A | 8/2021 |
| JP | 2021170847 A | 10/2021 |
| TW | M672919 U | 7/2025 |

OTHER PUBLICATIONS

Anonymous, “Cable—Wikipedia”, https://en.wikipedia.org/w/index.php?title=Cable&oldid=1296044554.

* cited by examiner

*Primary Examiner* — Jonathan M Blancha

(74) *Attorney, Agent, or Firm* — Li & Cai Intellectual Property (USA) Office

(57) ABSTRACT

An electronic device includes a display, an integrated camera disposed in the display, and a first cable disposed in the display and connected to the display and the integrated camera. The integrated camera of the electronic device includes an elongated circuit board, a camera module, and a first antenna. The elongated circuit board has a camera distribution segment and a first antenna distribution segment that is connected to one end of the camera distribution segment. The camera module is assembled to the camera distribution segment and has a first grounding portion. The first antenna is formed on the first antenna distribution segment, and the first antenna has a first feeding point, a first common ground end connected to the first grounding portion, and a first open circuit end that is arranged away from the first common ground end.

12 Claims, 12 Drawing Sheets

ELECTRONIC DEVICE AND INTEGRATED CAMERA THEREOF

CROSS-REFERENCE TO RELATED PATENT APPLICATION

This application claims the benefit of priority to Taiwan Patent Application No. 114100010, filed on Jan. 2, 2025. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is “prior art” to the disclosure described herein. All references cited and discussed in this specification are incorporated herein by reference in their entireties and to the same extent as if each reference was individually incorporated by reference.

FIELD OF THE DISCLOSURE

The present disclosure relates to a camera, and more particularly to an electronic device and an integrated camera thereof each having an antenna function.

BACKGROUND OF THE DISCLOSURE

A camera and an antenna provided in a conventional electronic device are designed to be independent from each other, such that the camera and the antenna need to occupy more interior space of the conventional electronic device and need to have a clearance region therebetween. Accordingly, the layout and the design of the antenna are limited because the antenna needs to be arranged on a remaining region available in the conventional electronic device, which usually has an irregular shape.

SUMMARY OF THE DISCLOSURE

In response to the above-referenced technical inadequacies, the present disclosure provides an electronic device and an integrated camera thereof for effectively improving on the issues associated with conventional electronic devices.

In order to solve the above-mentioned problems, one of the technical aspects adopted by the present disclosure is to provide an electronic device, which includes a display, an integrated camera, and a first cable. The display has a first long edge and a second long edge that is parallel to the first long edge. The display includes a grounding region and a first signal-permeable region that is arranged along the first long edge. The integrated camera is disposed in the display and includes an elongated circuit board, a camera module, and a first antenna. The elongated circuit board is arranged along and adjacent to the first long edge of the display. The elongated circuit board has a camera distribution segment and a first antenna distribution segment that is connected to one end of the camera distribution segment and that faces toward the first signal-permeable region. The camera module is assembled to the camera distribution segment. The camera module has a first grounding portion that is electrically coupled to the grounding region. The first antenna is formed on the first antenna distribution segment. The first antenna has a first feeding point, a first common ground end connected to the first grounding portion, and a first open circuit end that is arranged away from the first common ground end. The first cable is disposed in the display. Moreover, a first feeding wire of the first cable is connected to the display and the first feeding point of the first antenna, and the first antenna is configured to generate a signal resonance in a first frequency or a second frequency that is higher than the first frequency.

In order to solve the above-mentioned problems, another one of the technical aspects adopted by the present disclosure is to provide an integrated camera of an electronic device, which includes an elongated circuit board, a camera module, and a first antenna. The elongated circuit board has a camera distribution segment and a first antenna distribution segment that is connected to one end of the camera distribution segment. The camera module is assembled to the camera distribution segment, and the camera module has a first grounding portion. The first antenna is formed on the first antenna distribution segment, and the first antenna has a first feeding point, a first common ground end connected to the first grounding portion, and a first open circuit end that is arranged away from the first common ground end.

Therefore, the camera module and the first antenna provided by any one of the electronic device and the integrated camera in the present disclosure are jointly arranged on the elongated circuit board and are commonly grounded, so that the camera module and the first antenna do not need to have a clearance region therebetween, thereby effectively reducing an overall size of the integrated camera and improving a layout and a design of the first antenna.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
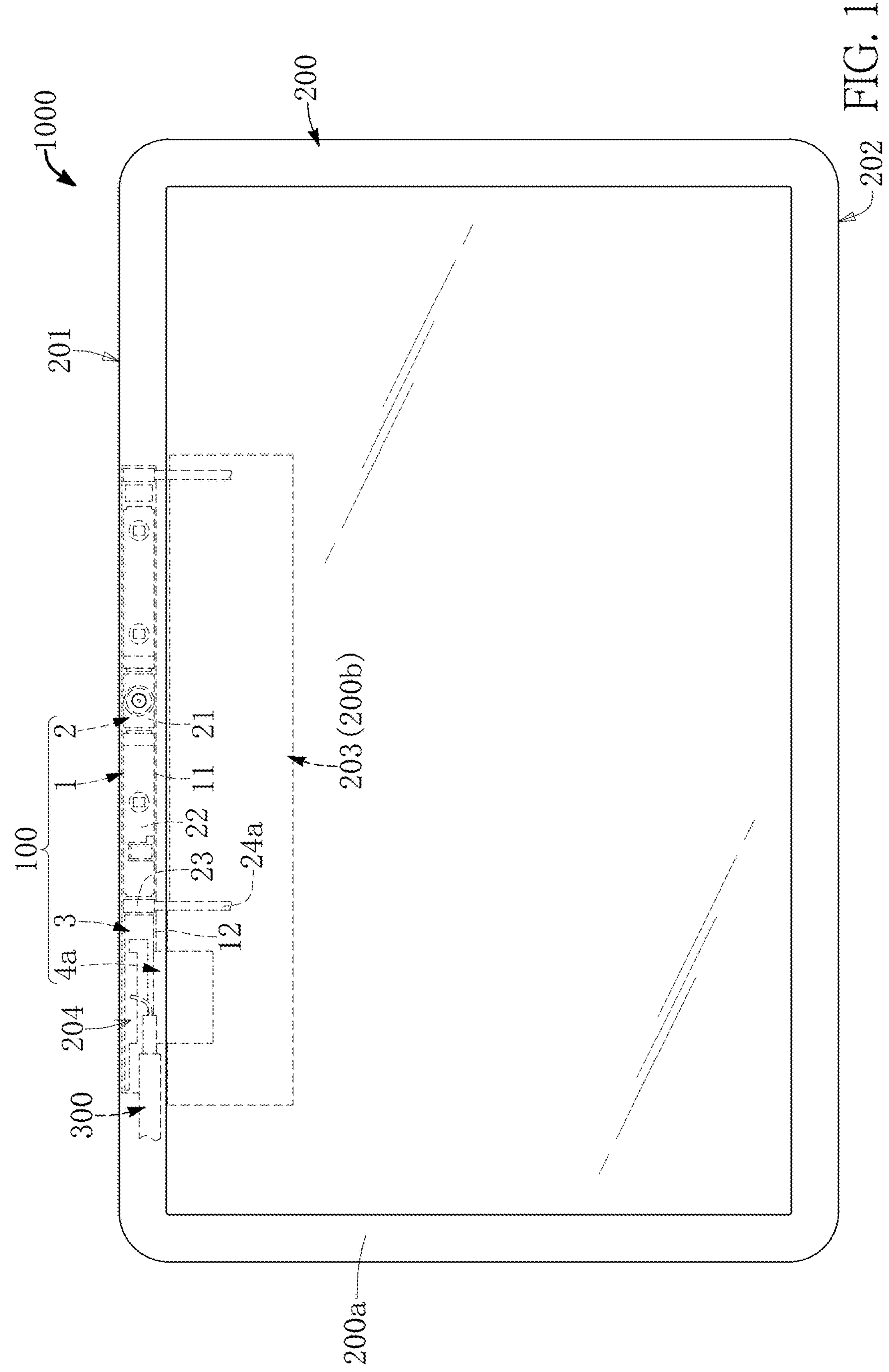
FIG. 1 is a schematic view of an electronic device according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

First Embodiment

Referring to FIG. 1 to FIG. 6, a first embodiment of the present disclosure is provided. As shown in FIG. 1 to FIG. 4, the present embodiment provides an electronic device 1000, which includes a display 200, an integrated camera 100 disposed in the display 200, and a first cable 300 that is electrically coupled to the display 200 and the integrated camera 100. It should be noted that the electronic device 1000 shown in FIG. 1 of the present embodiment is a tablet computer, and the integrated camera 100 is in cooperation with the display 200 and the first cable 300, but the present disclosure is not limited thereto.

For example, in other embodiments of the present disclosure not shown in the drawings, the integrated camera 100 can be independently used (e.g., sold) or can be used in cooperation with other components (e.g., the integrated camera 100 can be applied to a smart doorbell, a wearable camera, or smart glasses). The following description describes the structure and connection relationship of each component of the electronic device 1000.

The display 200 has a substantial rectangular shape and has a first long edge 201 and a second long edge 202 that is parallel to the first long edge 201. The display 200 includes a grounding region 203 and a first signal-permeable region 204 that is arranged along the first long edge 201, and a specific structure of the display 200 in the present embodiment can be changed or adjusted according to practical requirements.

Figure 2:
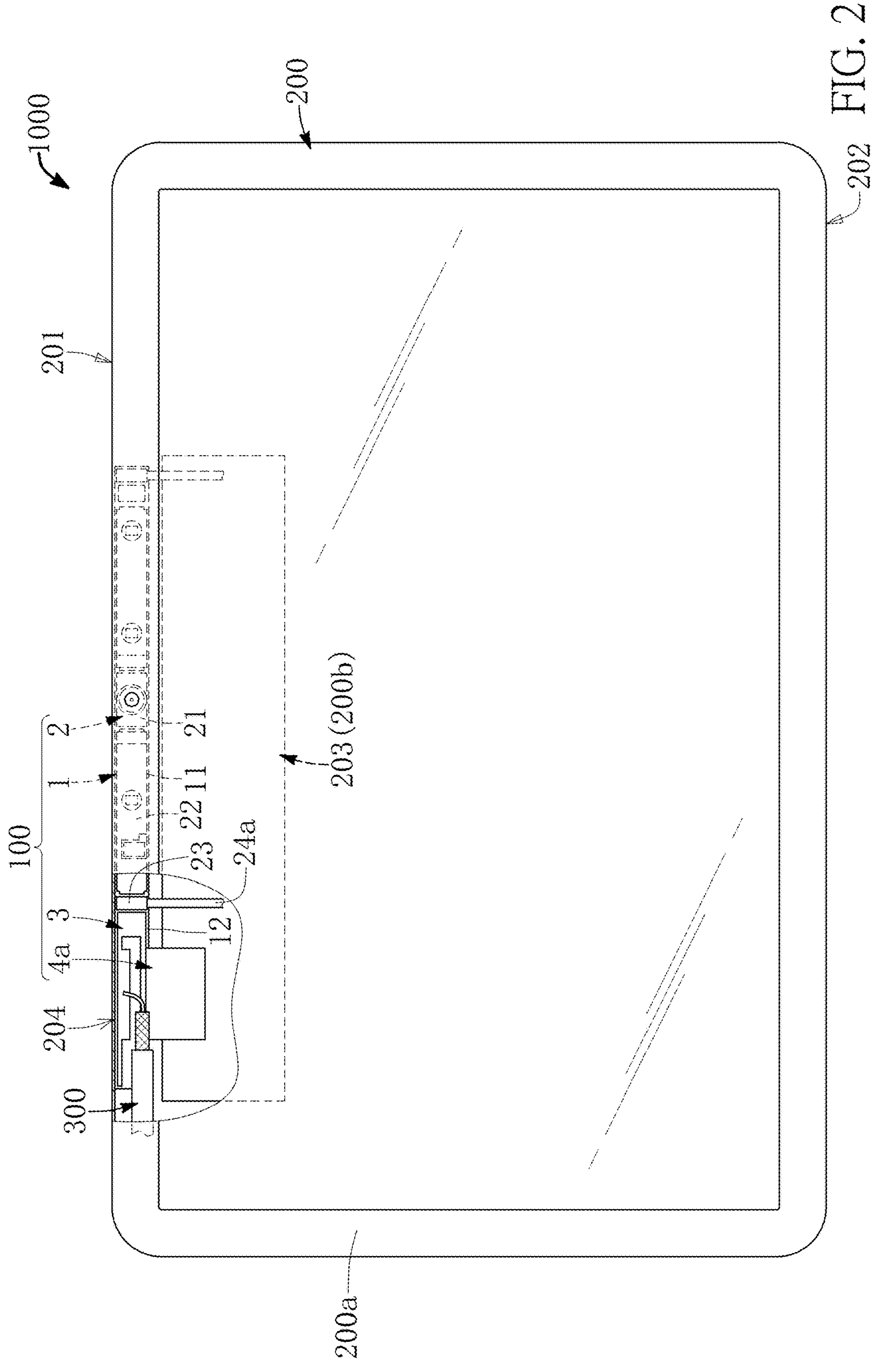
FIG. 2 is a schematic cross-sectional view of FIG. 1.
Figure 3:
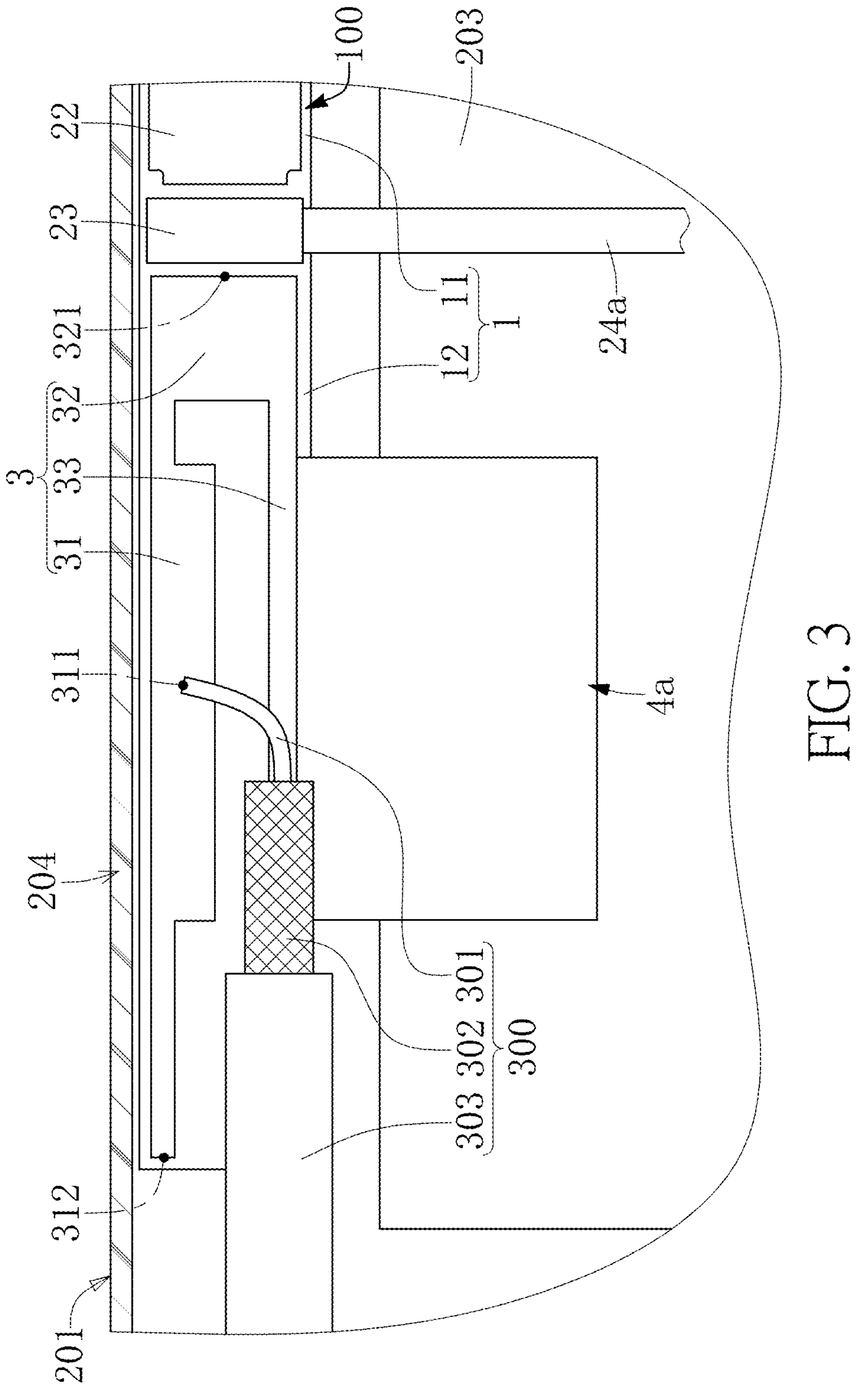
FIG. 3 is a schematic enlarged view of FIG. 2.
Figure 4:
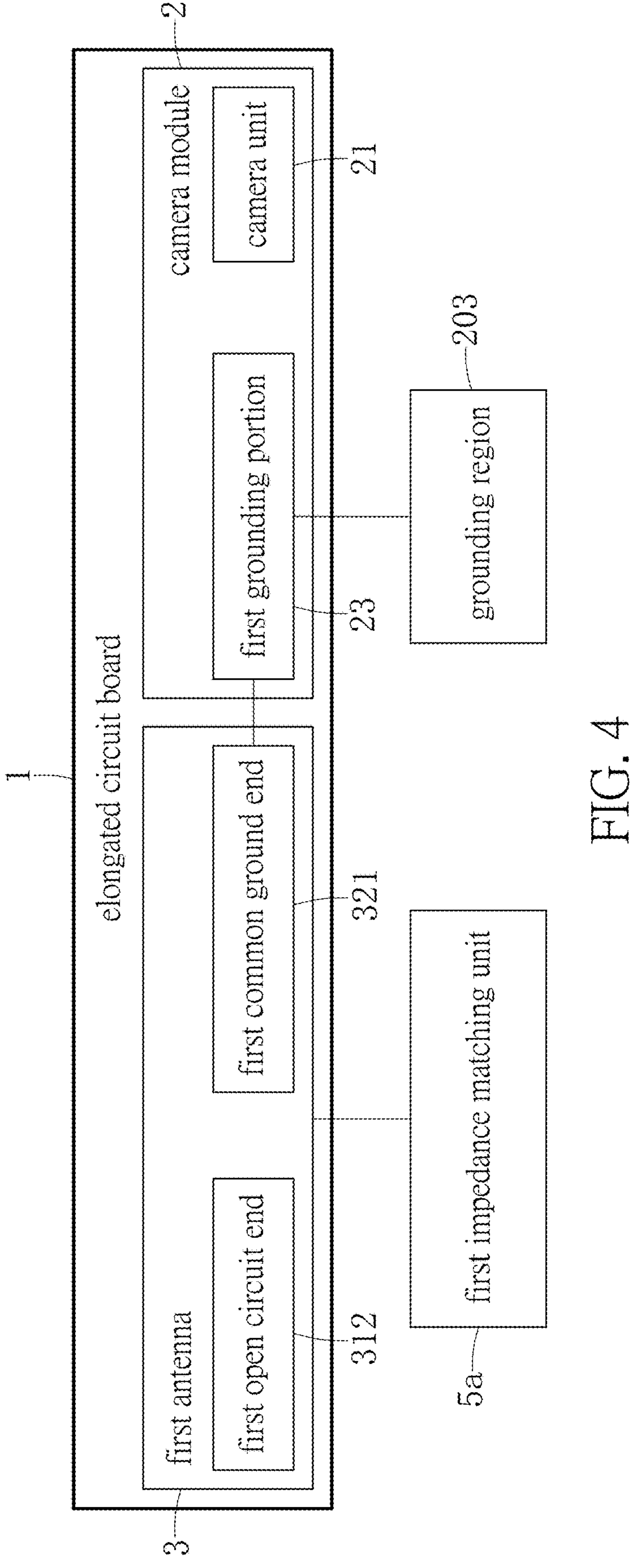
FIG. 4 is a functional block diagram of the electronic device according to the first embodiment of the present disclosure.
Figure 5:
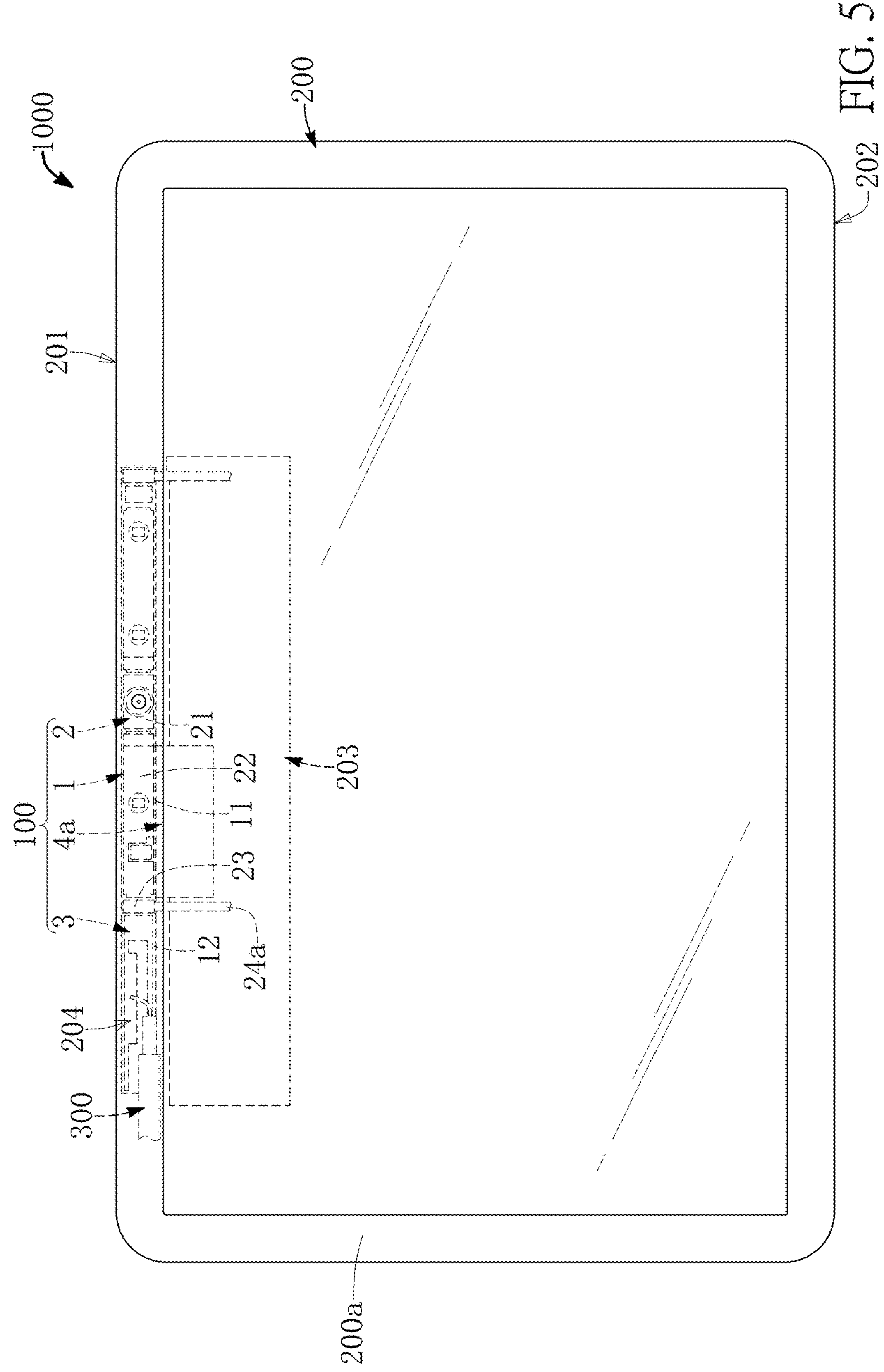
FIG. 5 is a schematic view showing a variation of the electronic device of FIG. 1.

For example, as shown in FIG. 1 to FIG. 3, the display 200 can include a plastic housing 200*a* and a metal component 200*b* (e.g., a copper foil) that is disposed in the plastic housing 200*a*, the grounding region 203 is arranged on the metal component 200*b*, and the first signal-permeable region 204 is arranged on the plastic housing 200*a*. Or, in other embodiments of the present disclosure not shown in the drawings, the display 200 can include a metal housing and a plastic window that is arranged on the metal housing, the grounding region 203 is arranged on the metal housing, and the first signal-permeable region 204 is arranged on the plastic window.

As shown in FIG. 1 to FIG. 4, the integrated camera 100 in the present embodiment includes an elongated circuit board 1, a camera module 2 assembled to the elongated circuit board 1, a first antenna 3 formed on the elongated circuit board 1, a first frequency adjustment component 4*a* connected to the elongated circuit board 1, and a first impedance matching unit 5*a* that is electrically coupled to the first antenna 3, but the present disclosure is not limited thereto. For example, in other embodiments of the present disclosure not shown in the drawings, the first frequency adjustment component 4*a* and/or the first impedance matching unit 5*a* of the integrated camera 100 can be omitted according to practical requirements.

In the present embodiment, the elongated circuit board 1 is arranged along and adjacent to the first long edge 201 of the display 200. In other words, the elongated circuit board 1 is substantially parallel to the first long edge 201 and is arranged adjacent to the grounding region 203. The elongated circuit board 1 has a camera distribution segment 11 and a first antenna distribution segment 12 that is connected to one end of the camera distribution segment 11 and that faces toward the first signal-permeable region 204.

The camera module 2 is assembled to the camera distribution segment 11 and includes a camera unit 21, a shielding case 22, and a first grounding portion 23. The camera unit 21 substantially corresponds in position to a central portion of the first long edge 201, and the shielding case 22 is configured to cover electronic components (not shown in the drawings) arranged inside thereof. The first grounding portion 23 can be any grounding structure that is disposed on the camera distribution segment 11 and that is arranged adjacent to the first antenna distribution segment 12, and the camera module 2 can be electrically coupled to the grounding region 203 through the first grounding portion 23.

Specifically, the first grounding portion 23 of the camera module 2 in the present embodiment can be electrically coupled to the grounding region 203 of the display 200 through at least one of a transmission wire 24*a*, a conductive adhesive (not shown in the drawings), and a conductive copper foil (not shown in the drawings), and the structure of the first grounding portion 23 can be adjusted or changed according to practical requirements, but the present disclosure is not limited thereto. In other words, the first grounding portion 23 in the present embodiment is a grounding structure of a connector, but the first grounding portion 23 in other embodiments of the present disclosure not shown in the drawings can be arranged on the shielding case 22 and a grounding structure connected to the shielding case 22 according to design requirements.

The first antenna 3 is formed on the first antenna distribution segment 12, and the first antenna 3 and the camera module 2 can be located on a same surface of the elongated circuit board 1, but the present disclosure is not limited thereto. For example, in other embodiments of the present disclosure not shown in the drawings, the first antenna 3 and the camera module 2 can be respectively located on two opposite surfaces of the elongated circuit board 1. Moreover, the first antenna 3 in the present embodiment is configured to (selectively) generate a signal resonance in a first frequency or a second frequency that is higher than the first frequency.

Specifically, the first antenna 3 has a first feeding point 311, a first common ground end 321 connected to the first grounding portion 23, and a first open circuit end 312 that is arranged away from the first common ground end 321. In other words, the first feeding point 311 is substantially arranged between the first common ground end 321 and the first open circuit end 312.

In the present embodiment, the first antenna 3 is an inverted F antenna (IFA), but the present disclosure is not limited thereto. The first antenna 3 has a circuit segment 31 being elongated, a common ground segment 32 connected to the circuit segment 31, and a grounding segment 33 that is connected to the common ground segment 32.

Widths of two end portions of the circuit segment 31 are decreased to increase a capacitance and to facilitate an implementation of matching. The first feeding point 311 is arranged between the two end portions of the circuit segment 31, one of the two end portions of the circuit segment 31 has the first open circuit end 312, and another one of the two end portions of the circuit segment 31 is (perpendicularly) connected to the common ground segment 32. The common ground segment 32 has the first common ground end 321 that is connected to the first grounding portion 23. The grounding segment 33 is (perpendicularly) connected to the common ground segment 32 and is spaced apart from the circuit segment 31.

Specifically, the first frequency adjustment component 4*a* (e.g., a copper foil) is configured to connect the grounding region 203 to the first antenna 3 (e.g., the first frequency adjustment component 4*a* being connected to the grounding segment 33 shown in FIG. 1 to FIG. 3) or the shielding case 22 of the camera module 2 (shown in FIG. 5) according to the first frequency or the second frequency, thereby effectively changing a frequency band of the first antenna 3 in operation.

As shown in FIG. 1 to FIG. 4, the first cable 300 is disposed in the display 200, and the first cable 300 includes a first feeding wire 301, an outer conductor 302 surrounding the first feeding wire 301, and a first insulating sleeve 303 that surrounds the outer conductor 302. The first feeding wire 301 is connected to the display 200 and the first feeding point 311, and the outer conductor 302 is connected to the grounding segment 33. The first feeding wire 301 and the outer conductor 302 in the present embodiment are isolated from each other in an insulation manner (not shown in the drawings). Accordingly, the first antenna 3 is configured to (selectively) generate the signal resonance in the first frequency or the second frequency. For example, the first antenna 3 can have a low-frequency resonance in the first frequency through a long edge thereof, or the first antenna 3 can have a high-frequency resonance in the second frequency through a short edge thereof.

In summary, the camera module 2 and the first antenna 3 of the electronic device 1000 in the present embodiment are jointly arranged on the elongated circuit board 1 and are commonly grounded, so that the camera module 2 and the first antenna 3 do not need to have a clearance region therebetween, thereby effectively reducing an overall size of the integrated camera 100 and improving a layout and a design of the first antenna 3.

Figure 6:
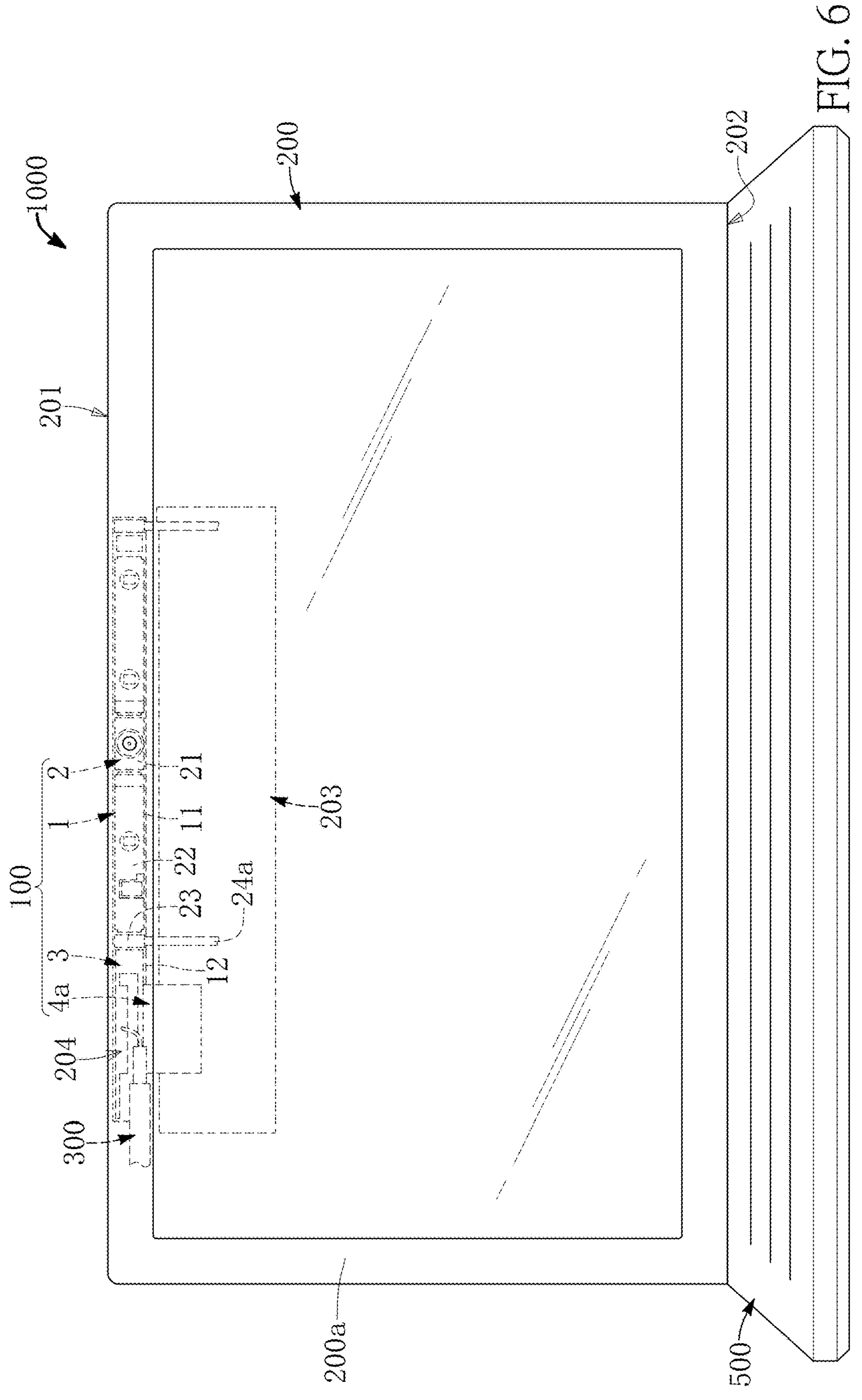
FIG. 6 is a schematic view showing the electronic device in another configuration according to the first embodiment of the present disclosure.

It should be noted that the electronic device 1000 shown in FIG. 1 to FIG. 5 of the present embodiment is the tablet computer, but the present disclosure is not limited thereto. As shown in FIG. 6, the electronic device 1000 can be a notebook computer including an input host 500 (e.g., a keyboard module), thereby effectively reducing an interference that may affect the first antenna 3 of the integrated camera 100.

Second Embodiment

Figure 7:
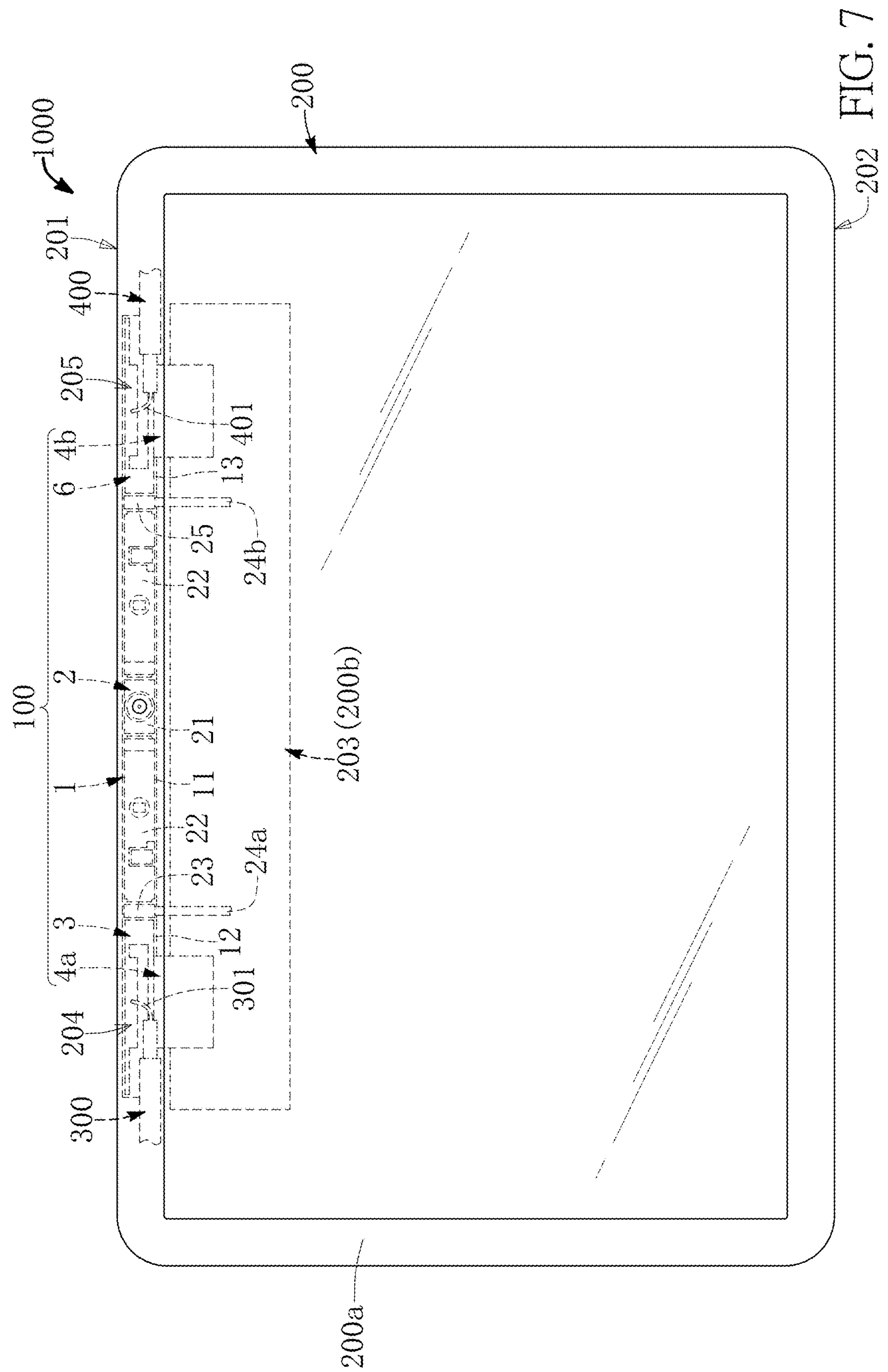
FIG. 7 is a schematic view of the electronic device according to a second embodiment of the present disclosure.
Figure 8:
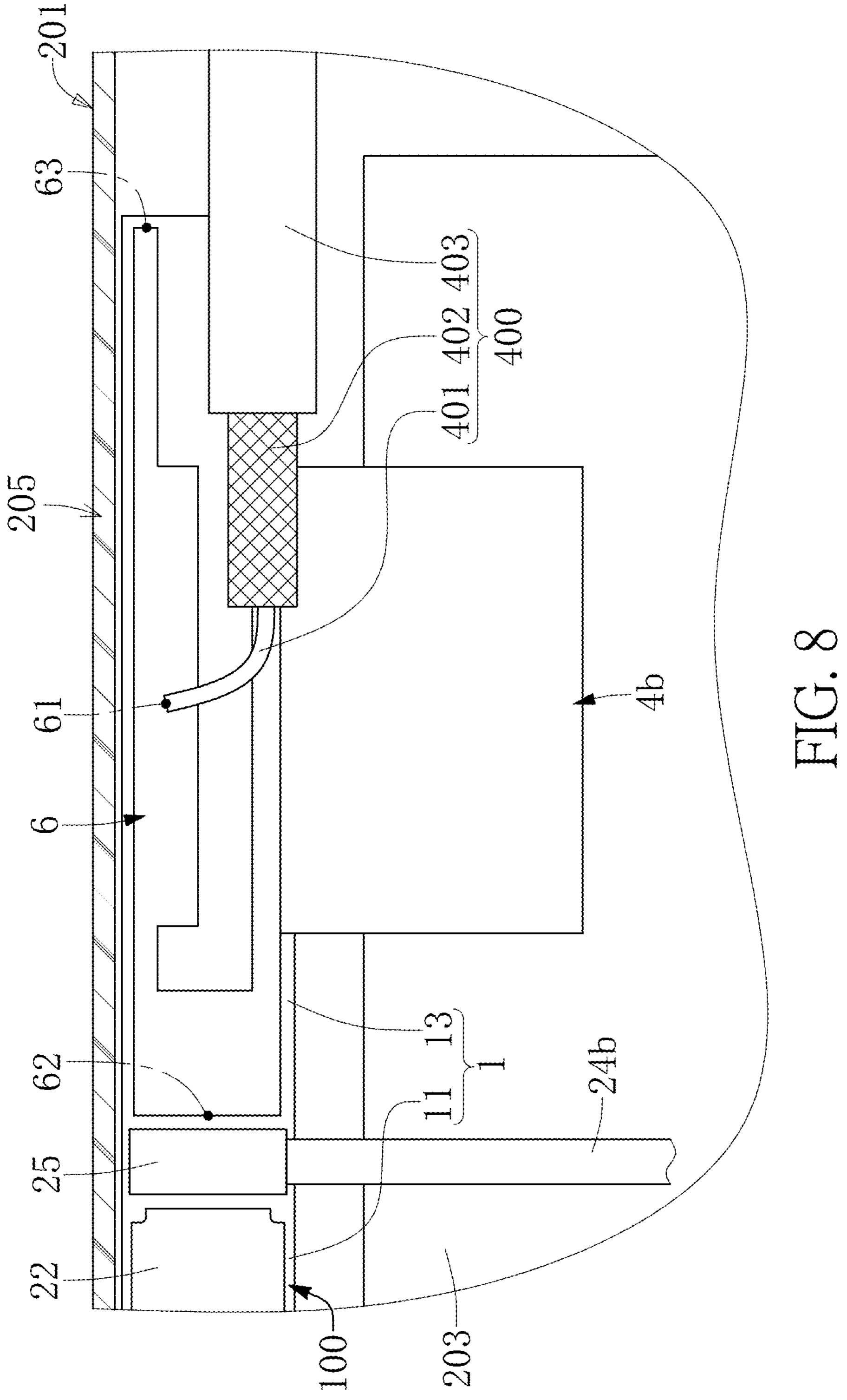
FIG. 8 is a schematic cross-sectional view showing a part of FIG. 7.

Referring to FIG. 7 and FIG. 8, a second embodiment of the present disclosure, which is similar to the first embodiment of the present disclosure, is provided. For the sake of brevity, descriptions of the same components in the first and second embodiments of the present disclosure will be omitted herein, and the following description only discloses different features between the first and second embodiments.

In the present embodiment, the display 200 includes a second signal-permeable region 205, and the first signal-permeable region 204 and the second signal-permeable region 205 are arranged along the first long edge 201 and are respectively arranged on two opposite sides of the first long edge 201. It should be noted that the formation and the definition of the second signal-permeable region 205 are substantially identical to those of the first signal-permeable region 204 and will be not described in detail herein for the sake of brevity.

Moreover, the integrated camera 100 in the present embodiment is substantially a mirror-symmetrical structure, but the present disclosure is not limited thereto. The elongated circuit board 1 has a second antenna distribution segment 13 that is connected to another end of the camera distribution segment 11 and that faces toward the second signal-permeable region 205.

The camera module 2 has a second grounding portion 25 electrically coupled to the grounding region 203, and the second grounding portion 25 can be any grounding structure that is disposed on the camera distribution segment 11 and that is arranged adjacent to the second antenna distribution segment 13. The second grounding portion 25 of the camera module 2 in the present embodiment can be electrically coupled to the grounding region 203 of the display 200 through at least one of a transmission wire 24*b*, a conductive adhesive (not shown in the drawings), and a conductive copper foil (not shown in the drawings), and the structure of the second grounding portion 25 can be adjusted or changed according to practical requirements, but the present disclosure is not limited thereto.

In addition, the integrated camera 100 in the present embodiment further includes a second antenna 6 and a second frequency adjustment component 4*b* that is connected to the elongated circuit board 1. The second antenna 6 is formed on the second antenna distribution segment 13, and the second antenna 6 has a second feeding point 61, a second common ground end 62 connected to the second grounding portion 25, and a second open circuit end 63 that is arranged away from the second common ground end 62.

Moreover, the electronic device 1000 further includes a second cable 400 disposed in the display 200. The second cable 400 includes a second feeding wire 401, an outer conductor 402 surrounding the second feeding wire 401, and a second insulating sleeve 403 that surrounds the outer conductor 402. The second feeding wire 401 and the second outer conductor 402 in the present embodiment are isolated from each other in an insulation manner (not shown in the drawings). The second feeding wire 401 is connected to the display 200 and the second feeding point 61 of the second antenna 6.

In addition, the structure and connection relationship of the second antenna 6, the second frequency adjustment component 4*b*, and the second cable 400 provided by the present embodiment are substantially identical to those of the first antenna 3, the first frequency adjustment component 4*a*, and the first cable 300 provided by the present embodiment, and will be not described in detail herein for the sake of brevity.

Third Embodiment

Figure 9:
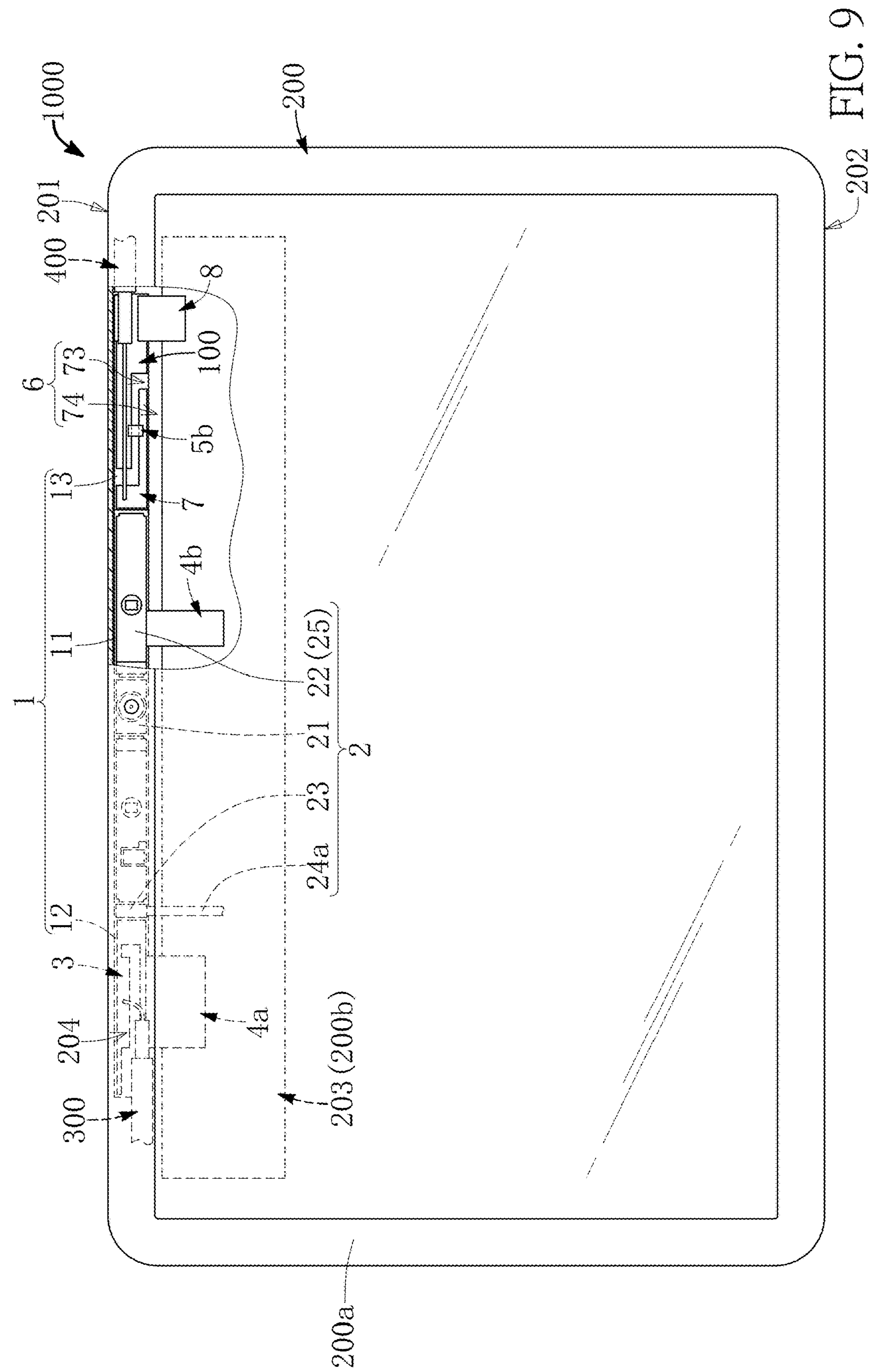
FIG. 9 is a schematic view of the electronic device according to a third embodiment of the present disclosure.
Figure 10:
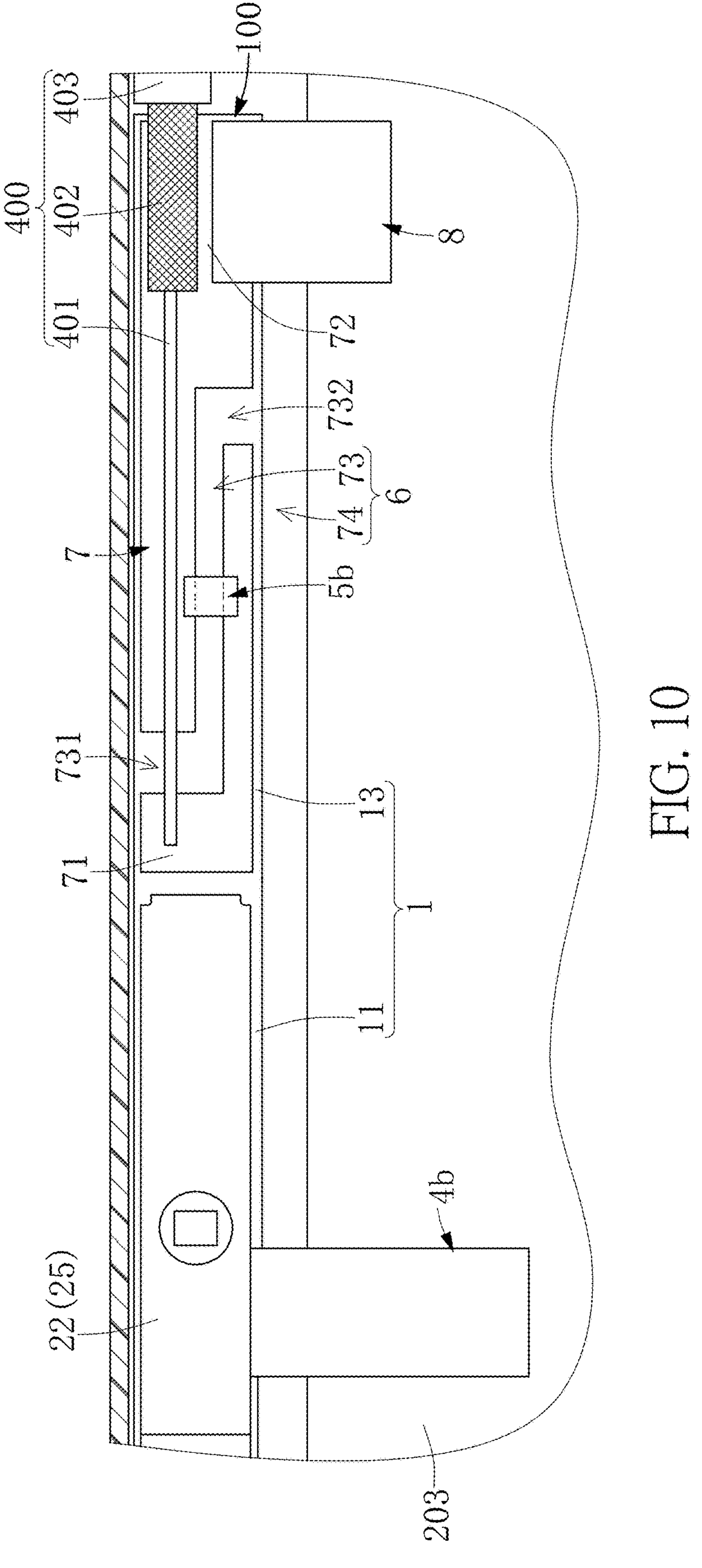
FIG. 10 is a schematic cross-sectional view showing a part of FIG. 9.

Referring to FIG. 9 and FIG. 10, a third embodiment of the present disclosure, which is similar to the first embodiment of the present disclosure, is provided. For the sake of brevity, descriptions of the same components in the first and third embodiments of the present disclosure will be omitted herein, and the following description only discloses different features between the first and third embodiments.

In the present embodiment, the display 200 includes a second signal-permeable region 205, and the first signal-permeable region 204 and the second signal-permeable region 205 are arranged along the first long edge 201 and are respectively arranged on two opposite sides of the first long edge 201. It should be noted that the formation and the definition of the second signal-permeable region 205 are substantially identical to those of the first signal-permeable region 204 and will be not described in detail herein for the sake of brevity.

Moreover, the integrated camera 100 in the present embodiment is substantially a mirror-symmetrical structure, but the present disclosure is not limited thereto. The elongated circuit board 1 has a second antenna distribution segment 13 that is connected to another end of the camera distribution segment 11 and that faces toward the second signal-permeable region 205. The camera module 2 has a second grounding portion 25, and the second grounding portion 25 can be any grounding structure that is disposed on the camera distribution segment 11 and that is arranged adjacent to the second antenna distribution segment 13. For example, the second grounding portion 25 can be arranged on a portion of the shielding case 22 adjacent to the second antenna distribution segment 13 and a grounding structure that is connected to the shielding case 22 according to design requirements, but the present disclosure is not limited thereto.

In addition, the integrated camera 100 of the present embodiment further includes a second frequency adjustment component 4*b*, a metal layer 7, a grounding component 8, and a second impedance matching unit 5*b*. The second frequency adjustment component 4*b* is connected to the second grounding portion 25 and the grounding region 203, and the second frequency adjustment component 4*b* is selectively connected to one of different positions of the second grounding portion 25 according to the first frequency or the second frequency.

Moreover, the metal layer 7 is formed on the second antenna distribution segment 13, and the metal layer 7 has a second common ground end 71 connected to the second grounding portion 25 and a second grounding end 72 that is arranged away from the second common ground end 71. The metal layer 7 has a first slot 73 that is arranged between the second common ground end 71 and the second grounding end 72 and that has an open circuit opening 731 and a communication opening 732.

The second impedance matching unit 5*b* (e.g., a capacitor and/or an inductor) is disposed across a portion of the first slot 73 that is between the open circuit opening 731 and the communication opening 732, but the present disclosure is not limited thereto. For example, in other embodiments of the present disclosure not shown in the drawings, the second impedance matching unit 5*b* can be omitted according to practical requirements.

The grounding component 8 is connected to the second grounding end 72 and the grounding region 203, such that the grounding region 203, the second grounding portion 25, the second frequency adjustment component 4*b*, the metal layer 7, and the grounding component 8 jointly define a second slot 74. Moreover, the second slot 74 is in spatial communication with the first slot 73 through the communication opening 732 so as to jointly form a second antenna 6 (i.e., a slot antenna 6).

The electronic device 1000 includes a second cable 400 disposed in the display 200. The second cable 400 includes a second feeding wire 401, an outer conductor 402 surrounding the second feeding wire 401, and a second insulating sleeve 403 that surrounds the outer conductor 402. The second feeding wire 401 and the second outer conductor 402 in the present embodiment are isolated from each other in an insulation manner (not shown in the drawings). The second feeding wire 401 is connected to the display 200 and the second common ground end 71, and the outer conductor 402 is connected to the second grounding end 72.

Fourth Embodiment

Figure 11:
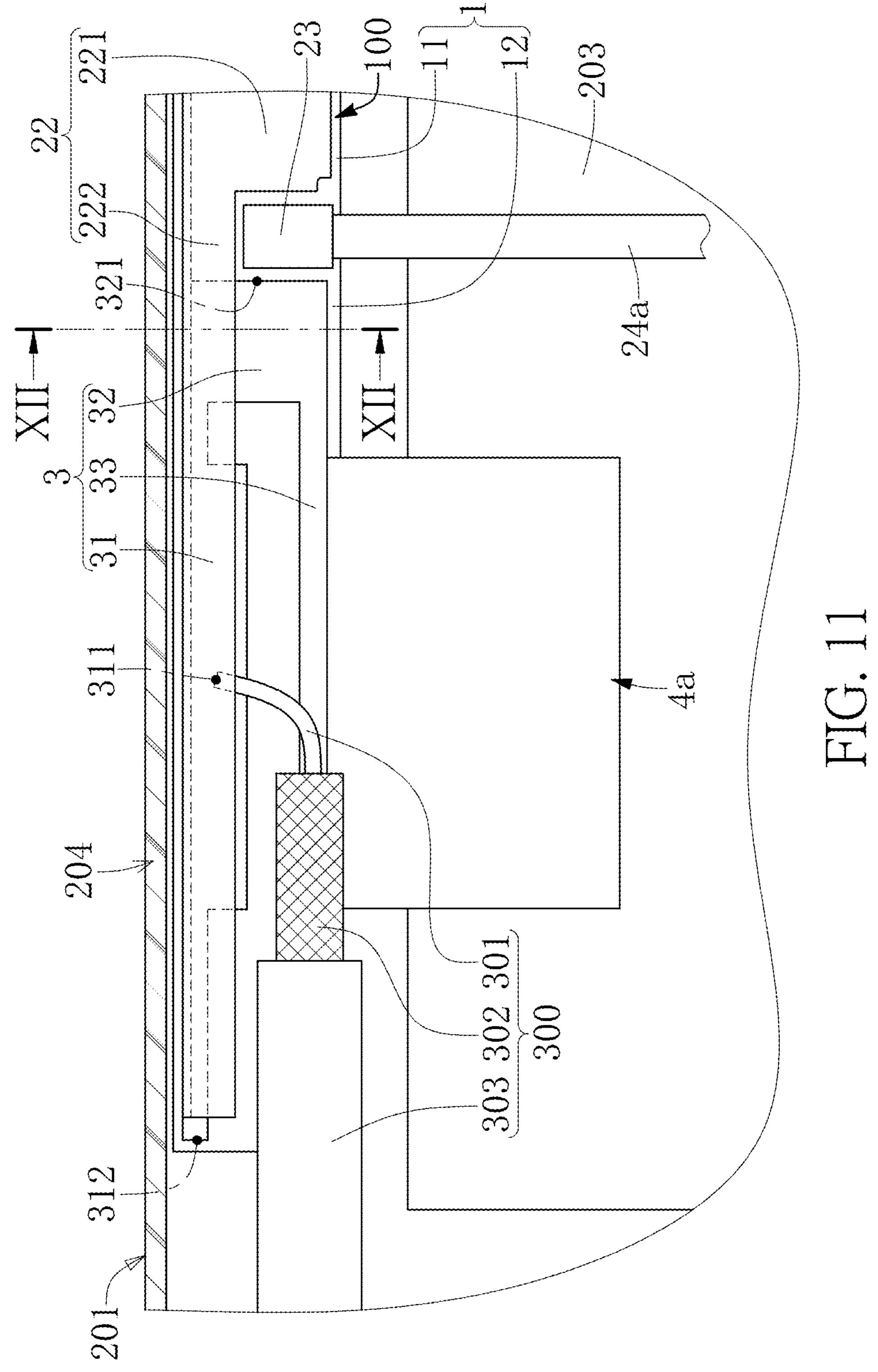
FIG. 11 is a schematic cross-sectional view showing a part of the electronic device according to a fourth embodiment of the present disclosure.
Figure 12:
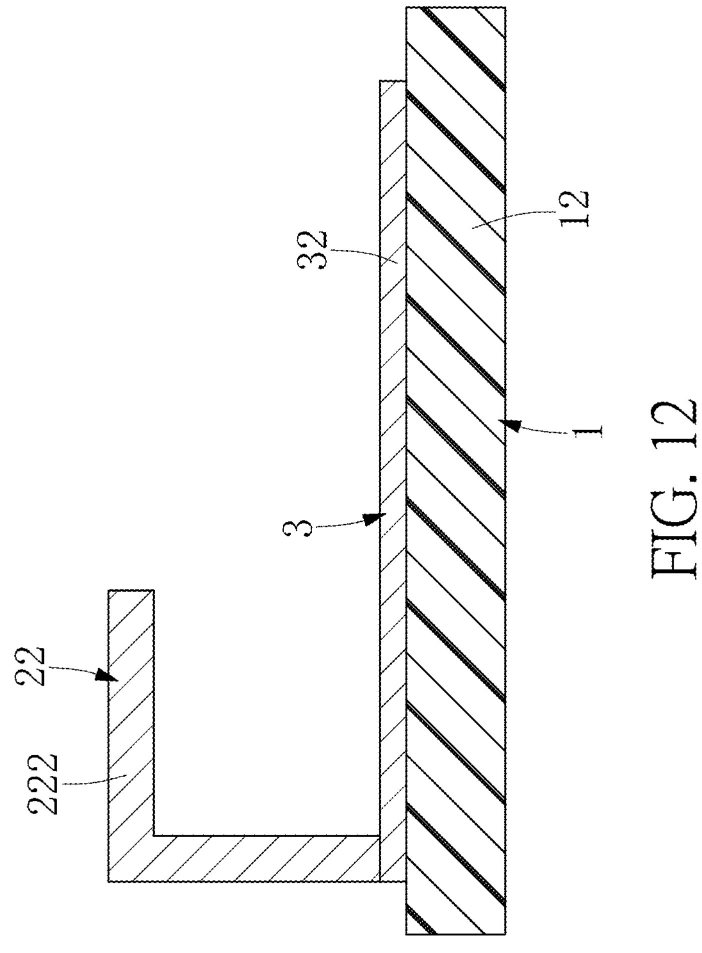
FIG. 12 is a schematic cross-sectional view taken along line XII-XII of FIG. 11.

Referring to FIG. 11 and FIG. 12, a fourth embodiment of the present disclosure, which is similar to the first embodiment of the present disclosure, is provided. For the sake of brevity, descriptions of the same components in the first and fourth embodiments of the present disclosure will be omitted herein, and the following description only discloses different features between the first and fourth embodiments.

In the present embodiment, the shielding case 22 includes a main segment 221 and an extension segment 222 that extends from the main segment 221. The main segment 221 is substantially disposed on the camera distribution segment 11, and the extension segment 222 has an elongated shape and is disposed on the first antenna distribution segment 12. The extension segment 222 can be arranged along the circuit segment 31, and a bottom of the extension segment 222 is connected to the first antenna 3 (e.g., the circuit segment 31 and/or the common ground segment 32), thereby effectively increasing a radiation area of the first antenna 3, but the present disclosure is not limited thereto. In other words, a specific structure of the extension segment 222 can be adjusted or changed according to practical requirements.

Beneficial Effects of the Embodiments

In conclusion, the camera module and the first antenna provided by any one of the electronic device and the integrated camera in the present disclosure are jointly arranged on the elongated circuit board and are commonly grounded, so that the camera module and the first antenna do not need to have a clearance region therebetween, thereby effectively reducing an overall size of the integrated camera and improving a layout and a design of the first antenna.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An electronic device, comprising:

a display having a first long edge and a second long edge that is parallel to the first long edge, wherein the display includes a grounding region and a first signal-permeable region that is arranged along the first long edge;

an integrated camera disposed in the display and including:

an elongated circuit board arranged along and adjacent to the first long edge of the display, wherein the elongated circuit board has a camera distribution segment and a first antenna distribution segment that is connected to one end of the camera distribution segment and that faces toward the first signal-permeable region;

a camera module assembled to the camera distribution segment, wherein the camera module has a first grounding portion that is electrically coupled to the grounding region; and a first antenna formed on the first antenna distribution segment, wherein the first antenna has a first feeding point, a first common ground end connected to the first grounding portion, and a first open circuit end that is arranged away from the first common ground end; and a first cable disposed in the display, wherein a first feeding wire of the first cable is connected to the display and the first feeding point of the first antenna, and the first antenna is configured to generate a signal resonance in a first frequency or a second frequency that is higher than the first frequency.

2. The electronic device according to claim 1, wherein the integrated camera includes a first frequency adjustment component, and wherein the first frequency adjustment component is configured to connect the grounding region to the first antenna or a shielding case of the camera module according to the first frequency or the second frequency.

3. The electronic device according to claim 2, wherein the shielding case includes:

a main segment disposed on the camera distribution segment; and an extension segment extending from the main segment and being disposed on the first antenna distribution segment, a bottom of the extension segment being connected to the first antenna.

4. The electronic device according to claim 2, wherein the display includes a second signal-permeable region, and the first signal-permeable region and the second signal-permeable region are respectively arranged on two opposite sides of the first long edge, wherein the elongated circuit board has a second antenna distribution segment that is connected to another end of the camera distribution segment and that faces toward the second signal-permeable region, and the camera module has a second grounding portion electrically coupled to the grounding region, wherein the integrated camera includes:

a second frequency adjustment component connected to the second grounding portion and the grounding region;

a metal layer formed on the second antenna distribution segment, wherein the metal layer has a second common ground end connected to the second grounding portion and a second grounding end that is arranged away from the second common ground end, and wherein the metal layer has a first slot that is arranged between the second common ground end and the second grounding end and that has an open circuit opening and a communication opening; and a grounding component connected to the second grounding end and the grounding region, wherein the grounding region, the second grounding portion, the second frequency adjustment component, the metal layer, and the grounding component jointly define a second slot that is in spatial communication with the first slot through the communication opening so as to jointly form a second antenna;

wherein the electronic device includes a second cable disposed in the display, wherein the second cable includes a second feeding wire and an outer conductor that surrounds the second feeding wire, and wherein the second feeding wire is connected to the display and the second common ground end, and the outer conductor is connected to the second grounding end.

5. The electronic device according to claim 2, wherein the first antenna has:

a circuit segment being elongated, wherein the first feeding point is arranged between two end portions of the circuit segment, and one of the two end portions of the circuit segment has the first open circuit end;

a common ground segment having the first common ground end, wherein another one of the two end portions of the circuit segment is connected to the common ground segment; and a grounding segment connected to the common ground segment and spaced apart from the circuit segment, wherein the first cable includes an outer conductor that surrounds the first feeding wire and that is connected to the grounding segment;

wherein the first frequency adjustment component is configured to connect the grounding region to the grounding segment of the first antenna or the shielding case of the camera module according to the first frequency or the second frequency.

6. The electronic device according to claim 1, wherein the display includes a second signal-permeable region, and the first signal-permeable region and the second signal-permeable region are respectively arranged on two opposite sides of the first long edge, wherein the elongated circuit board has a second antenna distribution segment that is connected to another end of the camera distribution segment and that faces toward the second signal-permeable region, and the camera module has a second grounding portion electrically coupled to the grounding region, wherein the integrated camera includes a second antenna formed on the second antenna distribution segment, wherein the second antenna has a second feeding point, a second common ground end connected to the second grounding portion, and a second open circuit end that is arranged away from the second common ground end, and wherein the electronic device includes a second cable disposed in the display, and a second feeing wire of the second cable is connected to the display and the second feeding point of the second antenna.

7. The electronic device according to claim 1, wherein the integrated camera includes a first impedance matching unit electrically coupled to the first antenna.

8. The electronic device according to claim 1, wherein the electronic device is a notebook computer further including an input host, and wherein the display is pivotally connected to the input host through the second long edge.

9. An integrated camera of an electronic device, comprising:

an elongated circuit board having a camera distribution segment and a first antenna distribution segment that is connected to one end of the camera distribution segment;

a camera module assembled to the camera distribution segment, wherein the camera module has a first grounding portion; and a first antenna formed on the first antenna distribution segment, wherein the first antenna has a first feeding point, a first common ground end connected to the first grounding portion, and a first open circuit end that is arranged away from the first common ground end.

10. The integrated camera according to claim 9, further comprising a first frequency adjustment component, wherein the first frequency adjustment component is selectively connected to the first antenna or a shielding case of the camera module.

11. The integrated camera according to claim 10, wherein the shielding case includes:

a main segment disposed on the camera distribution segment; and an extension segment extending from the main segment and being disposed on the first antenna distribution segment, a bottom of the extension segment being connected to the first antenna.

12. The integrated camera according to claim 9, wherein the elongated circuit board has a second antenna distribution segment that is connected to another end of the camera distribution segment, and the camera module has a second grounding portion, wherein the integrated camera includes a second antenna formed on the second antenna distribution segment, and wherein the second antenna has a second feeding point, a second common ground end connected to the second grounding portion, and a second open circuit end that is arranged away from the second common ground end.

* * * * *